United States Patent [19]

Kaplan et al.

[11] 3,794,873

[45] Feb. 26, 1974

[54] INTERCHANGEABLE SHADOW MASK

[75] Inventors: Sam H. Kaplan; Raymond M. Stachniak, both of Chicago, Ill.

[73] Assignee: Zenith Radio Corporation, Chicago, Ill.

[22] Filed: Nov. 6, 1972

[21] Appl. No.: 304,171

Related U.S. Application Data

[63] Continuation-in-part of Ser. No. 290,693, Sept. 20, 1972, abandoned.

[52] U.S. Cl. .............................. 313/85 S, 313/349
[51] Int. Cl. .............................. H01j 29/06, H01j 1/52
[58] Field of Search .............................. 313/85 S, 92 B, 349

[56] References Cited

UNITED STATES PATENTS 3,519,869 7/1970 Kuniyoshi .............................. 313/85 S
2,663,821 12/1953 Law .............................. 313/92 B

*Primary Examiner*—James W. Lawrence
*Assistant Examiner*—Wm. H. Punter
*Attorney, Agent, or Firm*—Nicholas A. Camasto

[57] ABSTRACT

A color television picture tube including an interchangeable multilayer shadow mask having a thin aperture-defining layer of a first material and a thick supporting layer of a second material. The mask is preformed while imperforate into its final curved configuration and the aperture pattern formed by photoexposure and selective etching. The holes in the supporting layer are larger than the corresponding apertures in the aperture-defining layer to establish an increasing undercut graded in accordance with distance from the geometric center of the tube.

2 Claims, 15 Drawing Figures

INTERCHANGEABLE SHADOW MASK

RELATED APPLICATION

This application is a continuation-in-part of application, Ser. No. 290,693, now abandoned, filed Sept. 20, 1972, by the present applicants for "INTERCHANGEABLE SHADOW MASK AND METHOD," which application is assigned to the same assignee as the present application.

BACKGROUND OF THE INVENTION

The most critical part of a shadow mask type of color television picture tube is the screen assembly which consists of the aperture mask, commonly referred to as a shadow mask, and associated elemental deposits or dots of phosphors of different colored light emitting characteristics. In accordance with generally accepted techniques, the phosphor dots of the screen are deposited on the faceplate panel of the color tube in a photoexposure process using the shadow mask as a negative. It is at this point that a particular shadow mask becomes "married" or "paired" to a particular panel through final tube assembly.

Since the inception of such color tubes, efforts have been made to provide an interchangeable mask system, the jamor benefit of which would be freedom to use any mask in conjunction with any screened panel. If such a system were available, screening masters would be used to photodeposit the phosphor dot screens on the inner surfaces of the faceplate panels, resulting in more uniform screen quality and marked improvement in screening yields. Losses due to mask handling would also be minimized and processing simplification attained as a result of not requiring mating masks. If the screening masters took the form of master masks, they could be of very rugged construction compared with the relatively fragile operating shadow masks. Preferably, stationary photographic or glass screening masters, with areas of differing light transmission characteristics, would be employed and the individual faceplate panels registered or indexed thereto.

More recently, a color television tube utilizing an operating shadow mask permitting electron beams of greater cross sectional area than the associated phosphor deposits on the faceplate has gained widespread acceptance. This size relationship has been generally accompanied by the interposition of visible-light-absorbing material between the phosphor deposits for contrast enhancement and to furnish a guard-band to preclude color purity problems. Such tubes are termed black-surround tubes because of the provision of the black light-absorbing grille between phosphor dots in negative guard-band tubes and because the electron spots are larger than the phosphor dots rather than smaller as in the case of the standard positive guard-band tubes. While the black surround may be put on after screening of the phosphor deposits, in practice the screen is manufactured by initially placing a grile of light-absorbing material on the inner surface of the faceplate in the desired pattern and then depositing the different phosphors in the appropriate holes of the grille. Tubes of this type and the various advantages obtainable therefrom are fully described in U.S. Pat. No. 3,146,368 in the names of Joseph P. Fiore and Sam H. Kaplan and assigned to the present assignee.

Numerous methods have evolved for achieving the desired size relationship between the electron beams and phosphor dots. Besides those enumerated in the above-identified patent, a production process in current use entails screening the faceplate of the tube with its "paired" shadow mask having temporary apertures of a first dimension and subsequently subjecting that shadow mask to a re-etch or additional chemical milling operation for enlargement of the apertures to final size. Naturally, the re-etch process entails additional cost and also increases the risk of damage during tube processing because of the extra handling steps. Additionally, damage to either the mask or screen after aperture enlargement results in the loss of both items.

It will be readily recognized that a system yielding mask interchangeability would, in addition to the reasons mentioned above, provide an attractive solution to making black-surround color tubes having the desirable beam area-phosphor dot size relationship specified in the above patent. For example, in an interchangeable mask system, a small-hole screening master could be used to form small phosphor deposits (or a black-surround grille with small holes for subsequent reception of phosphor deposits), while providing the actual operating shadow masks with apertures of larger final size.

One major obstacle to obtaining an interchangeable mask system is that shadow masks are conventionally etched, to produce the pattern of apertures or holes therein, while in the flat condition prior to forming and mounting on their permanent supporting structures. The term "forming" is used to denote the mechanical operation by which the mask is given a contour at least generally conforming to the contour of the inner surface of the faceplate panel which bears the phosphor screen. This contour is the operating configuration of the mask and is generally spherical. The supporting structure generally consists of a frame, to which the formed mask is affixed, which has provision for being removably supported in a predeterminable position adjacent the phosphor screen.

Hole etching before forming imposes difficult control problems because of material deformations during subsequent annealing and forming operations and this has made interchangeability difficult or impossible to achieve in mass production. Hole etching after forming and mounting of the shadow mask has likewise not been successfully accomplished from a commercial point of view, in part due to insufficient control when attempting to etch from one side only and difficulty in achieving accurate aperture pattern registration with a two-sided etch on a curved mask blank. The mask of the invention is formed into its ultimate spherical shape and mounted on its support frame prior to etching of the apertures therein. Etching is preferably performed from one side of the mask only, thus eliminating the requirement of registering aperture pattern images on opposite sides of the mask blank.

U.S. Pat. No. 3,676,914 issued July 18, 1972 to Joseph P. Fiore and assigned to the assignee of the present invention describes and claims a system for manufacturing interchangeable shadow masks for color television picture tubes as well as a system providing for total interchangeability between shadow masks and picture tube faceplate panels. The patent discloses apparatus for obtaining registered latent images of desired aperture patterns in photoresist coatings applied to opposite sides of a formed imperforate shadow mask. The apertures are then established by suitable etching. Exposure and etching from a single side of the formed mask are also described.

Unfortunately, when attempting to commercially produce apertures in the shadow mask with single-sided etching the problem of hole size control has proven undesirably difficult in mass production. For example, variations in thickness of a shadow mask, which is normally made of 6 mil steel, coupled with the tendency of ethcing to vary in accordance with grain structure of the mask metal, and the difficulty of maintaining the appropriate rate of etchant flow over the mask surface, introduce a large time variable for complete etching. Prolonging the etching time to insure complete aperture formation throughout the mask surface generally leads to severe undercutting of the photoresist in some areas with attendant undesired variations in hole size.

It will be appreciated that in the "pairing" system in commercial use, wherein the shadow mask and faceplate panel are "married" from beginning of screen processing, most hole size variations and other random deviations in mask characteristics are acceptable, and indeed unnoticeable in the finished tube by all but highly skilled observers. However, in a system founded on mask interchangeability, nearly all random deviations are unacceptable.

The problems associated with hole size are greatly reduced in severity by providing an identical aperture resist pattern on the opposite side of the mask, in registration with the first pattern, and partially etching from that side. This technique is also disclosed in Fiore U.S. Pat. No. 3,676,914 but requires the use of two aperture pattern exposures and appropriate apparatus for maintaining registration therebetween.

Economically, the consequence of a reject due to improper aperture formation for a formed shadow mask mounted on its support frame is severe compared with a similar reject incurred with a conventional mask, which is etched in the flat, or unformed, state. Because the raw material cost of the mask is small, the economic impact of a reject at an early phase of mask fabrication is minimal. The economic impact of a reject after mask annealing, forming and mounting is not minimal. Therefore, it is essential that any system in which the apertures are etched in the formed mask incorporate a high degree of process control, or alternatively, perform effectively irrespective of the aforementioned variables.

Accordingly, a principal object of this invention is to provide an improved color television picture tube.

A more specific object of this invention is to provide an interchangeable mask for a color television picture tube.

SUMMARY OF THE INVENTION

In accordance with the invention, an interchangeable shadow mask has a thin aperture-defining layer of a first material and a thick supporting layer of a second material. The apertures of the aperture-defining layer may be conventionally graded to diminish in size from center to edge. The holes in the supporting layer are graded to progressively undercut, i.e., be larger than, corrsponding apertures in the aperture-defining layer as a function of distance from the center of the mask.

The mask of the invention is fabricated by preforming it to its final spherical contour while in the imperforate state and mounting it to its supporting frame. It is then subjected to optical exposure techniques using an appropriate photoresist for forming a resist coating over the aperture-defining layer in the desired pattern. The mask is exposed through a master with actinic energy having a virtual or actual source at the center of the deflection plane of the picture tube as taught in Fiore U.S. Pat. No. 3,676,914. The mask is etched from one side only with a first etchant until the holes in the aperture-defining layer are formed and then with another etchant incapable of attacking the aperture-defining layer, until appropriate holes in the supporting layer are formed. The etchant flow is controlled to produce the graded undercut in the supporting layer. The aperture-defining layer may be either on the gun side or the screen side of the mask.

BRIEF DESCRIPTION OF THE DRAWINGS

Other objects and advantages of the invention will become apparent upon reading the following description of the preferred embodiment in conjunction with the drawings in which.

DESCRIPTION OF THE PREFERRED EMBODIMENT

Figures 1, 2:
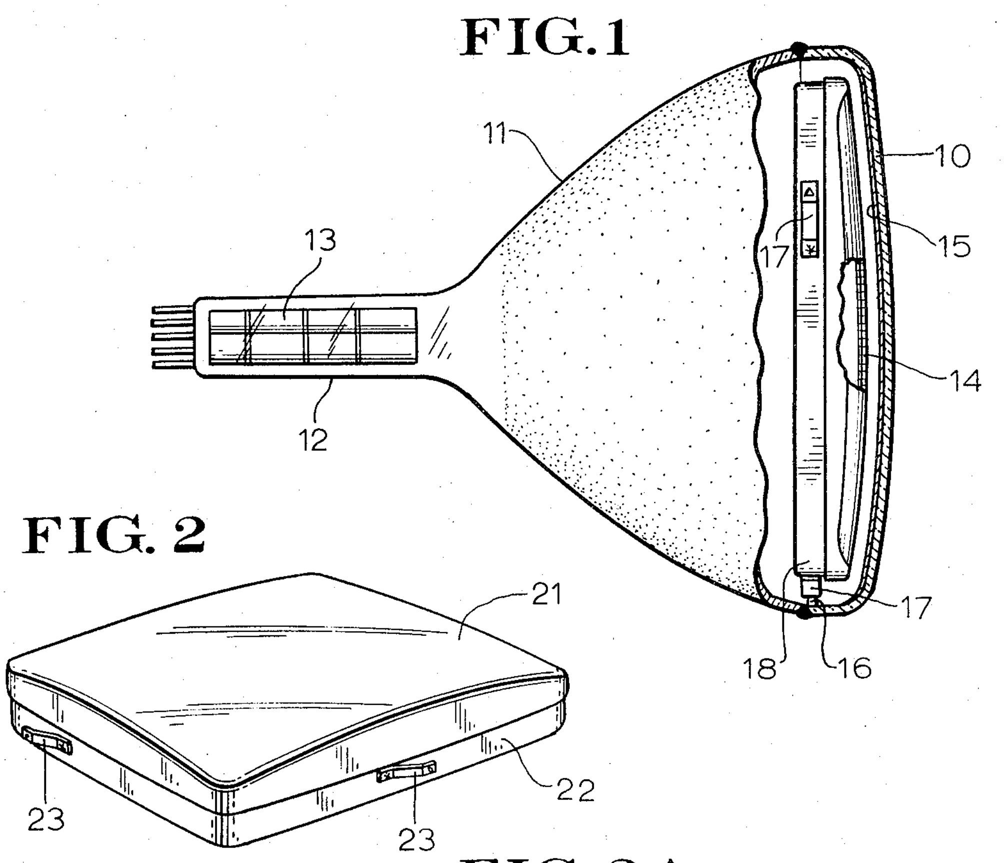
FIG. 1 is a sectionalized schematic representation of a completed color tube having a shadow mask constructed in accordance with the invention.
FIG. 2 is a perspective view of a preformed shadow mask assembly prior to etching of the apertures or holes therein.

In FIG. 1, there is shown a cross sectional view of a completed color cathode ray tube having a conventional faceplate panel 10 and a mating funnel 11 terminating in a neck 12 housing an electron gun structure 13. An interchangeable shadow mask 14 constructed in accordance with the invention is mounted in position adjacent a phosphor viewing screen 15 on the inner surface of panel 10. The shadow mask is indicated as being of laminated construction including an aperture-defining layer and a strengthening layer.

Registration of the interchangeable mask and phosphor screen may be conventionally accomplished by a plurality of mounting studs 16 located on the inner periphery of the faceplate panel and a corresponding plurality of mounting springs 17 affixed to the mask frame 18, to which mask 14 is attached. As will be described below, the aperture-defining layer may be either on the concave or gun side of the mask or on the convex or screen side. In either case, the aperture-defining layer is sufficiently thin to approximate knife edge definition of the holes.

In FIG 2, there is disclosed a formed or contoured imperforate shadow mask blank 21 mounted on a conventional supporting frame 22. The laminated mask, as will be seen in the other Figures, may comprise a relatively heavy layer of steel underlying a very thin layer of nickel. The nickel may be plated to the steel or the metals may be bonded together. Limitations on usable materials are imposed by the high processing temperatures to which the color tube is subject (approximately 500° C.) and their cost. Copper, silver, stainless steel and cobalt, for example, are acceptable substitutes for nickel in this application. Supporting frame 22 is massive in comparison with the mask and is fabricated of steel. Attached to supporting frame 22 are a plurality of conventional spring mounting members 23 for locating the shadow mask in a predetermined attitude with respect to the contoured faceplate panel of the color tube.

Without constituting specific limitations on the invention, and assuming nickel and steel are used, the thickness dimensions of the parts may typically be 6 mils for the steel layer, 0.3 to 0.5 mils for the nickel layer, and fifty mils for the supporting frame. The nickel layer, which will be seen to be the aperture-defining layer, is very thin in comparison with the steel layer, which primarily is for strengthening purposes.

Figure 3A:
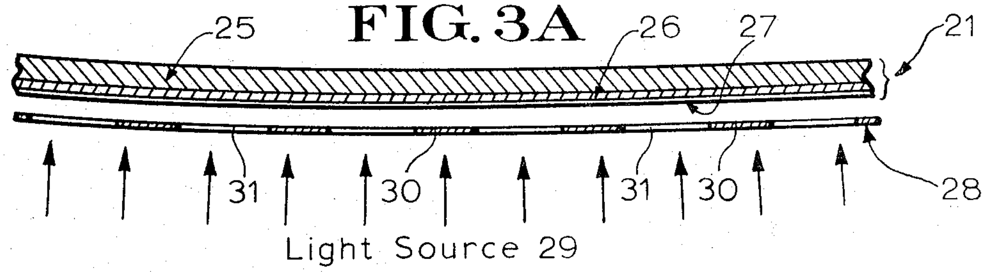
FIGS. 3A–3D represent partial cross sectional views of a shadow mask during various steps of its fabrication where the aperture-defining layer is on the convex or screen side of the mask.

In FIG. 3A, laminated mask blank 21 is shown as including a thick inner layer 25 and a very thin outer layer 26. A coating 27 of a photosensitive resist such as fish glue sensitized with an alkali metal dichromate is applied to thin layer 26. An exposure master 28, which may comprise a photographic transparency (or a solid replica thereof) is used to permit exposure of photosensitized coating 27 in the desired aperture pattern. The physical relationship between master 28 and the photosensitized coating on the laminated mask blank must be repeatable and fixed relative to the ultimate position of the shadow mask in an operating color tube and the deflection plane therein. An acceptable technique for attaining this relationship is to provide a simulated panel stud mounting arrangement (not shown) in a predetermined position relative to the light source and exposure master. For the mask and frame shown in FIG. 2, springs 23 would be engaged with corresponding studs to properly position the mask blank for exposure. Exposure of the photosensitized coating is made from a flooding source of actinic energy, specified as light source 29, through master 28. While not specifically shown, master 28 covers the entire surface of mask blank 21 and preferably matches its configuration so that only a very small spacing, such as 0.025 inch, is maintained. This relationship will insure sharp, properly defined exposed areas in the resist coating and enhance formation of the aperture pattern. With the sensitized fish glue photoresist indicated, the light source 29 may be an ultraviolet light.

As taught in Fiore U.S. Pat. No. 3,676,914, master 28 may be of flat rather than curved configuration as shown. In either event, the light source is preferably arranged to direct the principal irradiation rays toward a point corresponding to the center of deflection of the color tube. Thus the arrows representing the light radiation are indicated as being convergent at a point in the vicinity of the center of curvature of mask blank 21.

Sensitized fish glue is a negative photoresist, i.e., exposure to ultraviolet light will harden the fish glue and render it insoluble in an aqueous solution. The resist pattern desired on outer layer 26 is one which will permit selective etching where the apertures are. Therefore, use of this negative photoresist requires a "positive" master — one that is opaque in the areas 30 where apertures are desired and transparent in the other areas 31. Use of a positive photoresist would, contrariwise, dictate employment of a master with opposite transmission characteristics.

Figure 3B:
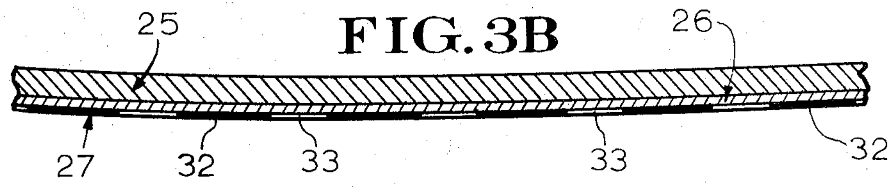

After exposure the photoresist is developed, which may consist of washing the entire structure in a water bath or subjecting it to a water spray. Here the unexposed (non-hardened) areas of the photoresist coating are removed and the pattern of apertures appears in the remaining hardened photoresist. The cross section will ideally be as depicted in FIG. 3B with hardened fish glue areas 32 defining apertures 33 on the surface of outer layer 26. For fish glue, a low temperature bake (e.g., at 240° C. for 10 minutes) is necessary at this stage. Another photoresist marketed by Dupont under the tradename Riston which does not require baking may also be used.

At this stage, it is desirable to provide a protective coating for the obverse face of the mask blank to protect it from etchant attack. The coating may comprise a wood resin or an acrylic polymer and may be applied by a conventional spinning technique. It will be recognized that any foreign material on the mask mounting springs may upset registration during exposure. It is thus preferable to photoexpose the mask blank even before applying the protective coating. The protective coating is not shown in the simplified drawings.

Figure 3C:
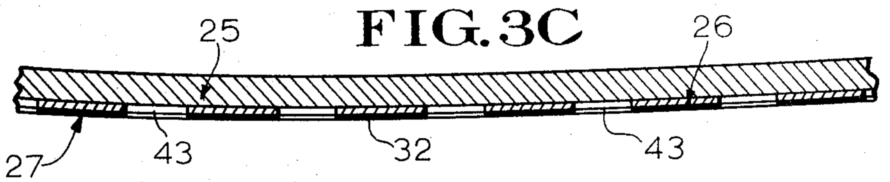

A suitable etchant is now applied to the photoresist and exposed areas of layer 26. All of the processing steps contemplate using an etchant spray upwardly directed against a horizontally disposed mask. The etchant may be delivered from a plurality of nozzles operating at about 33 psi approximately 8 inches away from the mask. In the case of nickel and steel laminations, the etchant may be ferric chloride $FeCl_3$ of 42 degrees Baume concentration at a temperature between 125°–150° F. which attacks nickel as well as steel. Etching is carried out for only the time required to completely form holes 43 through the thin layer of nickel to minimize undercutting of the photoresist which would adversely affect the aperture size. This is shown in FIG. 3C. With the etchant and arrangement described, the etching time for this step is about one minute. The hardened photoresist may now be stripped from the mask assembly, if desired, but is has been found preferable to leave the photoresist intact since it doesn't interfere with subsequent operations and prevents possible migration of etchant through the nickel to the steel below. The protective coating is also left on. A spray rinse with water may be performed at this point.

Figure 3D:
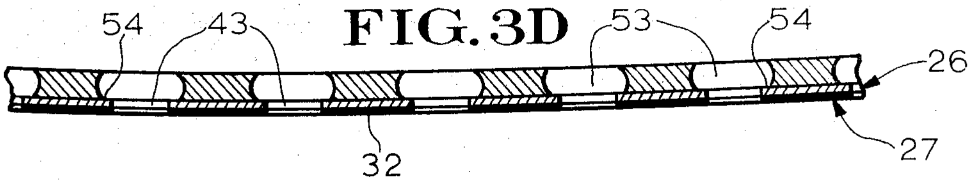
Figure 4A:
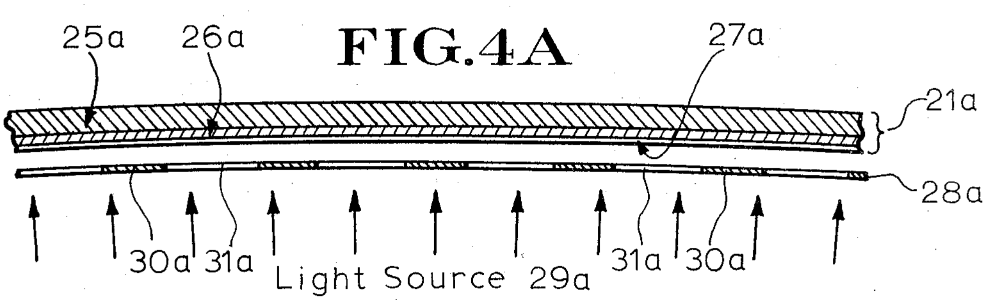
FIGS. 4A–4D are partial cross sectional views of a shadow mask during various steps of its fabrication where the aperture-defining layer is on the concave or gun side of the mask.
Figure 4B:
Figure 4C:
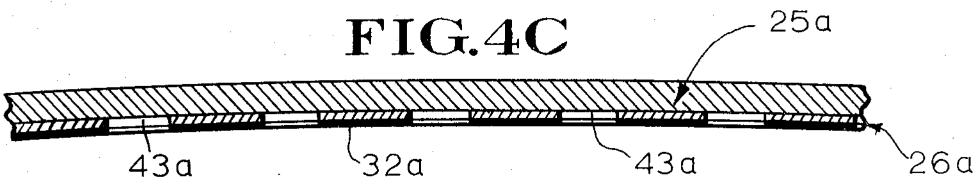
Figure 4D:
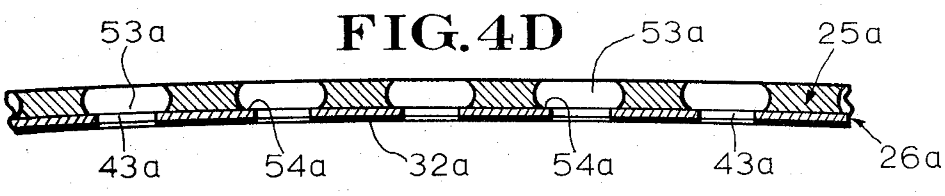

Referring to FIG. 3D, a second etching operation is performed with an etchant capable of attacking layer 25, but to which the material of layer 26 is immune, through the previously etched holes in layer 26. For nickel and steel, the etchant may be ferric sulphate $Fe_2(SO_4)_3$ of 35 degrees Baume concentration in the same temperature range of 125°–150° F. Layer 26 functions as a resist, allowing etching of layer 25 in the areas registering with holes 43 (apertures 33 in the photoresist). The etching time is not critical because the apertures are defined by layer 26 which is not attacked by the second etchant, the criterion being that etching be carried out for a time sufficient to permit substantial undercutting of the aperture defining layer, as will be fully discussed below. Typically, with the etchant and arrangement described, this etching step will take about five minutes for nickel and steel of the specified thickness dimensions. The mask is then subjected to another water rinse step.

After complete etch-through of mask blank 21, the photoresist layer is removed. It has been found advantageous at this stage to subject the mask to another short clean-up etching operation with the first etchant to remove any minor irregularities in the aperture edges caused by incomplete removal of the unexposed photoresist during developement. Again for nickel and steel of the specified thicknesses, this etching step may be performed by subjecting the mask to a ferric chloride spray for about 15 seconds followed by another water rinse.

FIG. 3D clearly shows the undercutting of layer 26 which is allowed to occur during the second etch, those portions being indicated by reference numeral 54. Undercutting provides clearance so that the cross section of the electron beam striking the phosphor screen in the tube is defined by thin layer 26. Because of the greater deflection angle of the beam, more undercutting is required in the peripheral areas of the shadow mask. Thus as will be discussed below the peripheral areas of the mask are subjected to a greater etchant flow to remove more of layer 25.

In FIGS. 4A–4D, there are shown cross sections of a formed shadow mask blank during various stages of processing in which the orientation between the aperture-defining layer and the strengthening layer is reversed. Here thin aperture-defining layer **26*a* is on the concave or gun side of mask blank 21*a* and supporting layer 25*a* is on the convex or screen side. Exposure of the photoresist coating 27*a* covering layer 26*a* is made from a source of actinic energy 29*a* through a master 28*a*, having opaque areas 30*a* and transparent areas 31*a*, arranged to define a desired aperture pattern. Source 29*a*** may be a point source positioned at the virtual deflection center of the tube.

Development proceeds as previously described and the hardened portions of the photoresist remaining on layer **26*a* define the aperture pattern. Layer 26*a*** is then treated with a suitable etchant for a time sufficient to completely etch through this layer.

The further steps of the process as described in connection with FIGS. 3A–3D are performed with a second etchant, incapable of attacking layer **26*a*, being applied to layer 25*a* through the just etched apertures 43*a* in layer 26*a*. Etching is continued until sufficient undercutting is obtained as described above. The materials specified for the mask, the etchants therefor and other process parameters are the same as those described in connection with FIGS. 3A–3D.**

Figure 5A:
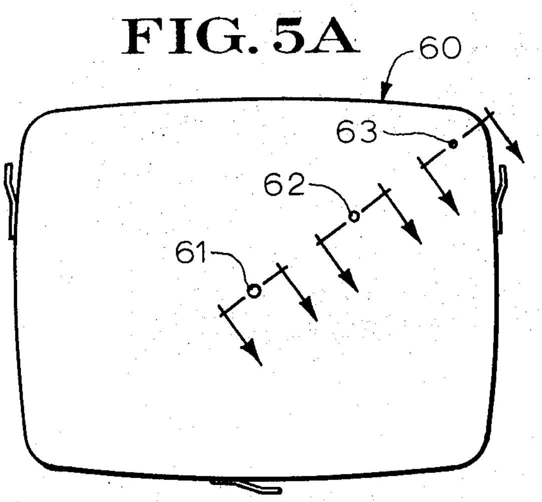
FIGS. 5A–5E are idealized representations of a mask and selected apertures therein showing the relationship of under-cutting and distance from the mask center.

FIG. 5A is a representation of a shadow mask 60 with only three illustrative apertures 61, 62 and 63 shown. Aperture 61 is in the geometric center of the mask, aperture 62 approximately midway out on a diagonal and aperture 63 at the end of the diagonal in a corner of the mask. The apertures are shown in sectional form in FIGS. 5B–5D as viewed from the direction indicated by the arrows. The mask is of the type described in FIGS. 3A–3D where the aperture-defining layer is on the screen side and is assumed for purposes of this analysis to be flat.

In FIGS. 5B–5D, 65 is the aperture-defining layer, 66 the supporting or base layer, T the supporting layer thickness, *d* the amount of undercut represented by the difference in radius between the aperture and the corresponding hole in supporting layer 66, R a path perpendicular to the mask, *r* the actual path of the electron beam and $\alpha$ the beam deflection angle. The beam deflection angle $\alpha$ corresponds, at its maximum, to one-half of the normally stated angle for the tube. For example, in a 70° deflection angle tube, $\alpha_{max.} = 35°$, for a 90° tube, $\alpha_{max.} = 45°$, and for a 110° tube, $\alpha_{max.} = 55°$.

Figure 5B:
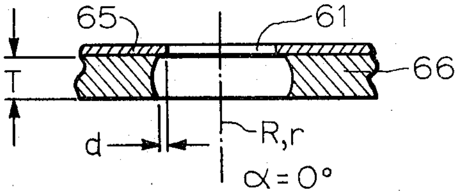

Since aperture 61, shown in FIG. 5B, is in the geometric center of mask 60, R and r coincide and $\alpha = 0°$. The amount of undercut *d* necessary to allow aperture 61 to define the electron beam cross sectional area is thus very small and, under ideal conditions, is zero for aperture 61.

Figure 5C:
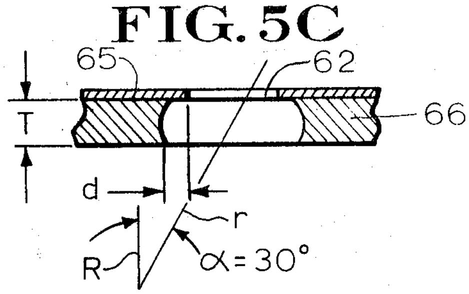
Figure 5D:
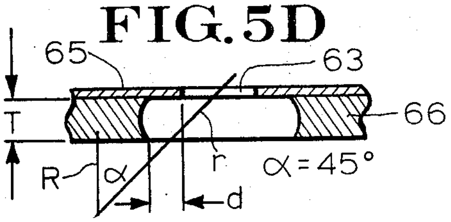

Aperture 62 shown in FIG. 5C is approximately midway between the center and corner of the mask and is slightly smaller in diameter than aperture 61. This is in accordance with standard techniques of grading the aperture sizes in the shadow mask to help correct for degrouping errors which occur in the delta gun system and errors due to non-coincidence between the center of deflection of the tube and the center of curvature of the mask and screen. At this location, the angle $\alpha$ is approximately 30° and the amount of undercut *d* is increased. In FIG. 5D, $\alpha$ is approximately 45° and in this position the undercut *d* is equal to the effective mask thickness T. While the actual mask thickness includes the thickness of aperture-defining layer 65, this is small compared with the thickness of supporting layer 66 and may be ignored.

Figure 5E:
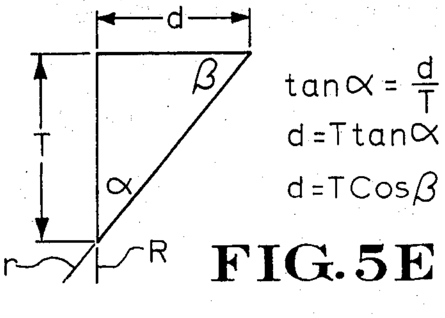

Inspection of FIG. 5E indicates that the amount of undercut desired is a function of the mask thickness and the deflection angle and is independent of aperture size. The relationship is graphically depicted for the condition where $\alpha$ 45°.

By observation, $\tan \alpha = d/T$ and $d = T \tan \alpha$ or $d = T \cot \beta$, where $\beta$ is the angle of incidence of the electron beam on the mask.

In practice, mask 60 is spherically formed and consequently the above analysis is only approximate since it is based upon a flat mask. For a 25 inches color picture tube, the effect of the curvature increases the angle of incidence of the electron beam on the mask by about 10° in the mask corners. Thus for a conventional 90° tube, the effective $\alpha$ at the corners would be $45° - 10° = 35°$, and the maximum amount of undercut would be only about 70% of the mask thickness. Depending on mask geometry and aperture array, it may be desirable in some cases to use somewhat less undercut at the edges than the optimum represented by the formula, for the sake of preserving structural integrity of the mask; in any event, in accordance with the invention, the amount of undercut is substantially proportional to the cotangent of the angle of electron beam incidence upon the mask.

The choice of which of the two embodiments of shadow masks is employed will in general be determined by the manner of mounting the mask in the tube. For example, if a conventional support frame and spring arrangement is used (as shown in FIG. 2), optical simplicity dictates exposure from the gun side which makes the embodiment of FIGS. 4A–4D particularly attractive. The exposure source is located at the point corresponding to the center of deflection of the picture tube (as is done in a conventional lighthouse) with the master in fixed relationship with the source. Means for mounting the blank mask in registry with the master may readily be provided.

If the mask is of the "frameless" type which must be supported from the faceplate of the picture tube as disclosed in the copending application of Kaximir Palac, Ser. No. 285,985, filed Sept. 5, 1972, and assigned to the same assignee, the embodiment discussed in FIGS. 3A–3D is preferable. Changes would be required in the light source arrangement since the rays must be directed toward a convergent point located at the center of deflection of the picture tube as indicated in the previously mentioned Fiore U.S. Pat. No. 3,676,914. Thus the type shadow mask employed will determine the preferred embodiment.

In any case, undercutting of the base layer is essential to insure that the cross sectional area of the electron beam is effectively determined by the aperture-defining layer to prevent substantial beam clipping. The amount of undercutting increases as a function of the distance from the center of the mask and is at least substantially proportional to the cotangent of the angle of electron beam incidence upon the mask. Graded undercutting may be obtained by varying the etchant flow through the mask aperture during the second etch so that more etchant flows through the apertures near the periphery of the mask than flows through those near the center. Since the aperture-defining layer is immune to the etchant in the second etch, grading the undercutting via a variable etchant flow is readily performed without endangering the aperture pattern.

It will be seen that the described embodiments of the invention disclose an interchangeable mask which eliminates the requirement of pairing the mask and panel. With the arrangements described, a master exposure system may be used to produce substantially identical aperture patterns in the preformed mask blanks and, due to differential etching properties of the mask structures, the patterns may be accurately maintained during subsequent processing. The phosphor screens may be deposited on the panels using a master exposure system and thereafter any screen may be used with any mask to make the color tube.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A two-layered interchangeable shadow mask for use in a color television picture tube having an electron beam scanned phosphor screen bearing faceplate panel of given contour, said mask generally conforming to the contour of the panel and comprising a thin layer of material defining a pattern of apertures supported by a thick base layer of a different material; said base layer defining a like plurality of holes corresponding to the apertures in said pattern, which holes increasingly undercut said apertures by an amount which is substantially proportional to the cotangent of the angle of electron beam incidence upon the mask.

2. A color television picture tube including a contoured faceplate; a funnel having a large end mated to said faceplate and a neck housing an electron gun structure for directing electron beams toward said faceplate; a phosphor screen on the inner surface of said faceplate; and an interchangeable shadow mask positioned adjacent to and in registry with said phosphor screen, said shadow mask having a contour matching that of said inner surface of said face-plate and including a pattern of apertures for shadowing portions of said phosphor screen from all but selected electron beams from said gun structure; said shadow mask being constructed of a thin layer of a first material defining the apertures in said pattern and a thick layer of a second material providing support for said thin layer; said thick layer having a pattern of holes corresponding to said pattern of apertures with each hole being juxtaposed to a corresponding aperture and undercutting the same, the amount of said undercutting being substantially proportional to the cotangent of the angle of electron beam incidence upon the mask.

* * * * *